United States Patent

[11] 3,628,635

| [72] | Inventor | Kiyokazu Yoshigai<br>9-15 Wakaeminami-machi 1-chome,<br>Higashiosaki-shi, Osaka-fu, Japan |
|---|---|---|
| [21] | Appl. No. | 875,699 |
| [22] | Filed | Nov. 12, 1969 |
| [45] | Patented | Dec. 21, 1971 |
| [32] | Priorities | May 10, 1969 |
| [33] | | Japan |
| [31] | | 44/42885;<br>Aug. 8, 1969, Japan, No. 44/75899 |

[54] BICYCLE BRAKE
4 Claims, 7 Drawing Figs.

[52] U.S. Cl. ............................................... 188/26, 188/24
[51] Int. Cl. ............................................... B62l 1/12
[50] Field of Search ............................................... 188/24, 26; 280/289

[56] References Cited
FOREIGN PATENTS

| 496,247 | 10/1950 | Belgium | 188/24 |
| 989,562 | 4/1965 | Great Britain | 188/26 |
| 1,279,836 | 11/1961 | France | 188/26 |
| 361,725 | 6/1962 | Switzerland | 188/26 |
| 391,491 | 9/1965 | Switzerland | 188/26 |

OTHER REFERENCES 391,491, 9- 1965, Swiss Publication, Vienat

*Primary Examiner*—Milton Buchler
*Assistant Examiner*—Stephen G. Kunin
*Attorney*—Sughrue, Rothwell, Mion, Zinn and Macpeak ABSTRACT: The present invention relates to a side-pull bicycle brake mechanism having major and minor arch members wherein it is required to pull upwards on one end of said major arch member by means of a wire in the case a pair of brake shoes are one-sided from the center, and so constructed that a small tensile force can achieve a big brake effect with easy handling by providing simple force magnifying means between the pulling member of said major arch member and said wire, so that said pair of brake shoes can be always actuated and applied equally to the two sides of bicycle rim.

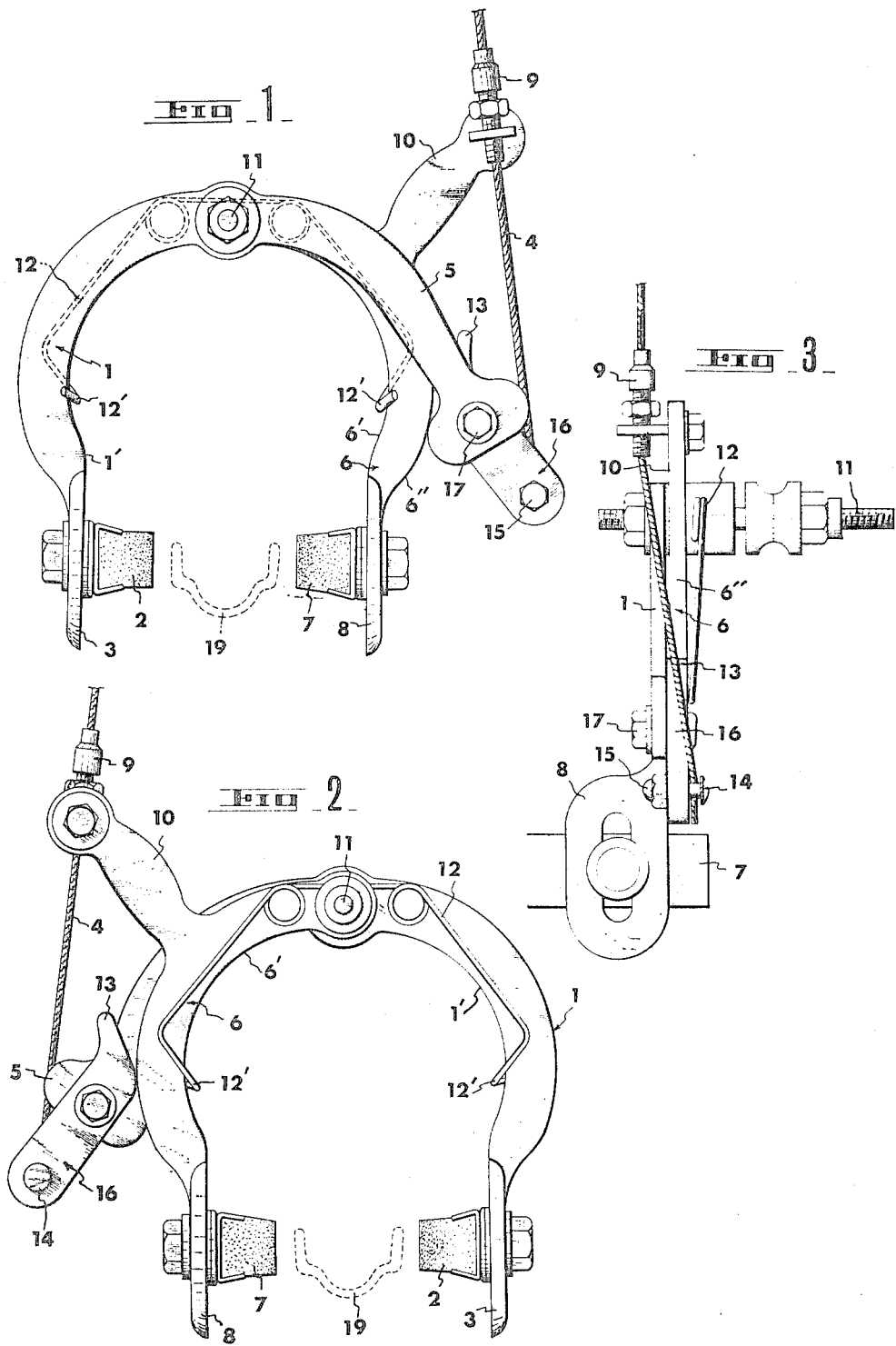

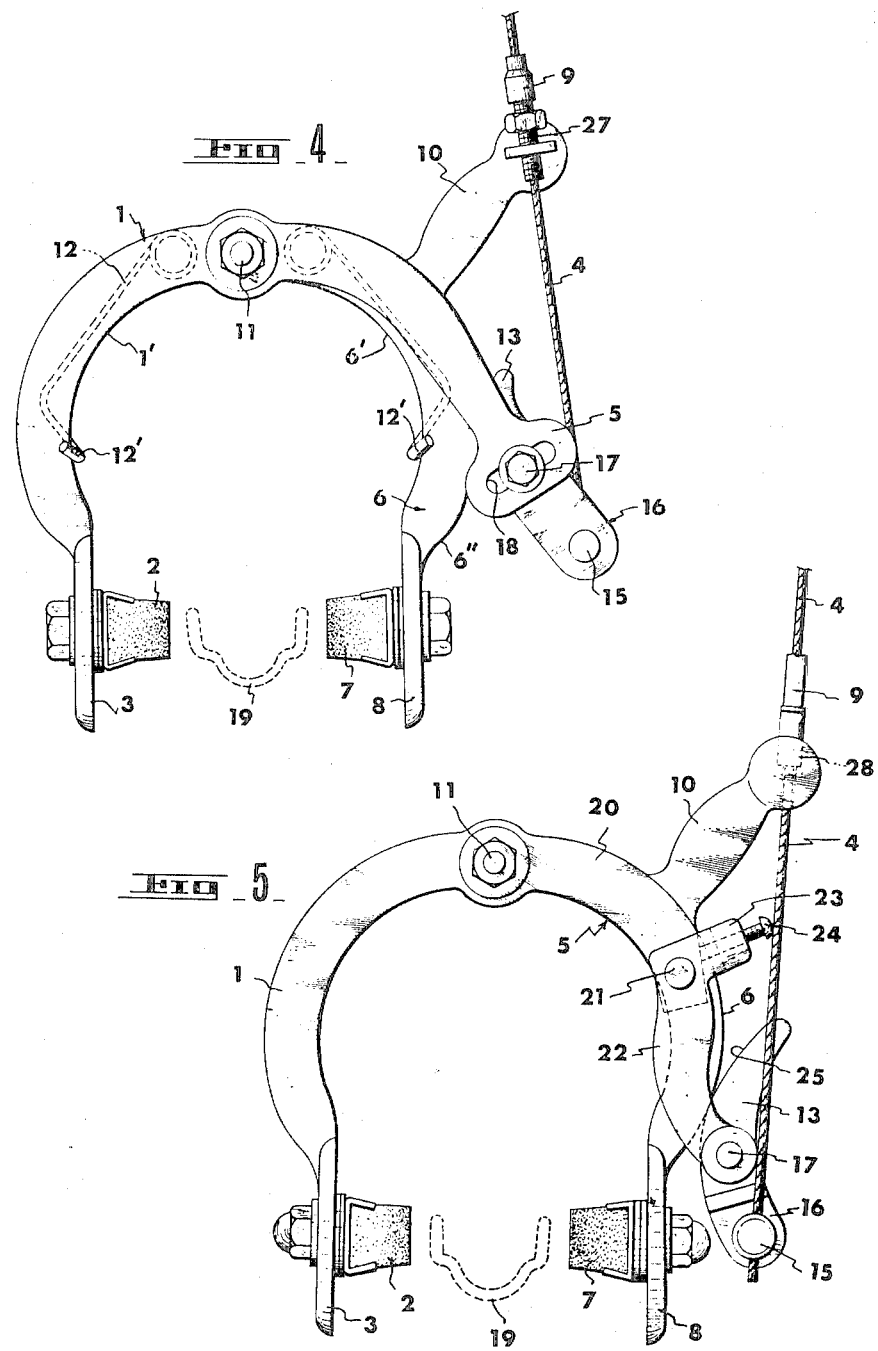

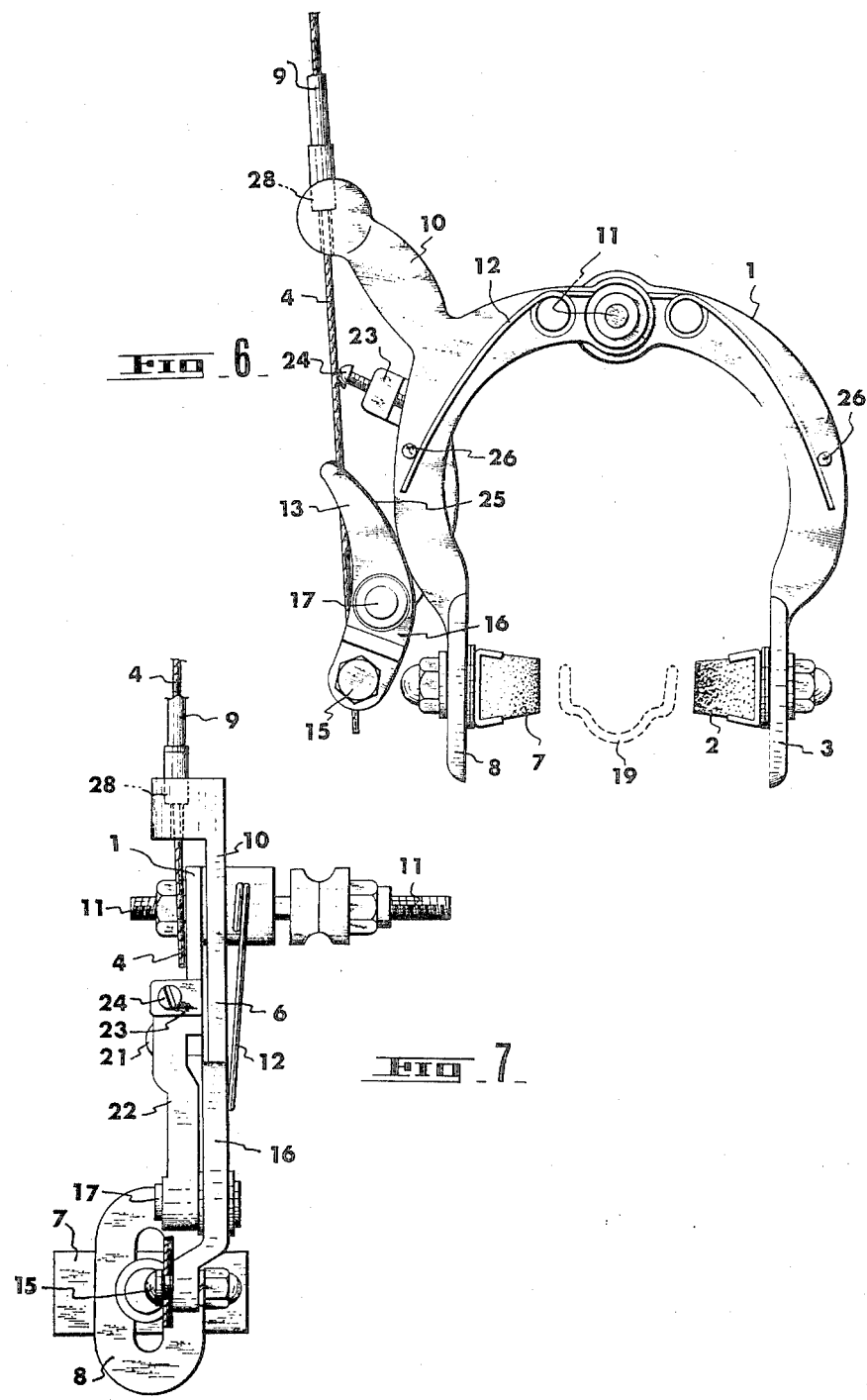

BICYCLE BRAKE

Hitherto as known, the conventional side-pull bicycle brake mechanism is so constructed that a major arch member and a minor arch member half as long as the said major arch member is pivoted on each other at the center point of said major arch member. The respective remaining ends of said two arch members facing each other are attached each with a brake shoe, and there is used a compounding pull wire consisting of an inner wire and an outer wire connected to the bicycle brake hand lever. One end of said inner wire is connected with the coupling arm portion of said major arch member which partially overlaps on said minor arch member and, said outer wire is engaged with one portion of said minor arch member. The inner wire is pulled upward to actuate the coupling arm portion and pull the major arch member upwards together. The major arch member is turned to take a supporting point where pivoted, so that the brake shoe attached to the remaining arm portion of said major arch member is pushed towards the bicycle rim. The outer wire is simultaneously lowered due to the reaction force caused by pulling said inner wire so that said minor arch member is turned, in the direction opposite said major arch member, to take the same supporting point as above, resulting that the brake shoe affixed with the lower end of said minor arch member is pushed to the other side face of the bicycle rim, thereby achieving a brake effect due to said pair of brake shoes being pushed towards the two sides of the bicycle rim. It is also clear from the foregoing construction that said two arch members are forced to open outwards by means of a comparatively powerful spring, in order that the respective brake shoes of said two members can be positively retracted from the two side faces of the bicycle rim during running. For this reason, the turning of said major arch member due to the pulling of said inner wire as well as the simultaneous turning of said minor arch member actually need the force to oppose the elastic force of this spring. Especially, in the case of applying a sudden brake, a more powerful force is required without fail and delay in time. For instance, when a bicycle is driven to run on a long sloped roadway at a suitable speed under the working of brake effect, the brake handling is obviously accompanied with great labor and fatigue caused thereby, due to the fact that said pull wire is frequently pulled against the force of such powerful spring. In order to reduce the required force, it has been proposed to use a spring of comparatively small force, but this is not available in view of the drawback that it is almost impossible to separate without fail the respective brake shoes of said two arch members from the bicycle rim. It has been further proposed to make said two arch members from lightweight materials so that a weak spring may be available. However, this cannot be recommended with respect to the strength in construction since shocks and impacts easily occur due to the unevenness of the roadway. Furthermore, no favorable means of making the brake components light in mass can be found.

The present invention is to resolve the foregoing defects. According to the present invention, there is provided a profitable brake wherein said two arch members are opened by means of a sufficiently powerful spring, and the respective two brake shoes are ensured to separate from the bicycle rim. Also, suitable materials can be employed for said two arch members in view of the constructive strength, and the necessary labor can be considerably reduced to satisfy brake application with such side-pull brake mechanisms even by using the above-mentioned heavy arch members and to insure accurate and light handling in time. The brakes are so constructed that a simple force magnifying means is interposed between said inner wire and the coupling arm portion of said major arm member which partially overlaps on said minor arch member having a brake shoe at one end and which is coupled with said inner wire connected to a bicycle brake lever. The tensile actuation force of said inner wire is transmitted to said force magnifying means and is imparted to said two arch members. A part of said means is contacted on the outer side face of said minor arch member which and is pivoted on said coupling arm portion so that said two arch members which are openable under a powerful spring can be lightfully closed each in harmony with other, by using a small force. In addition, there is provided a brake, so constructed that it is possible to regulate the variable fixture position of said force magnifying means with the coupling arm portion of said major arch member and further to adjustably join two divisional sections of said coupling arm portion so that relative gaps between one brake shoe and one side of a rim as well as the other brake shoe and the other side of said rim can be freely adjusted. Therefore, the present brake affords a considerably easy handling in this kind by using a relatively simple mechanism, a light working force without necessity of excessive force, and reliability in performance, with no disorder.

The object of the present invention is to provide a side-pull bicycle brake mechanism wherein a single lever is freely pivoted on the lower end of one-side coupling arm portion of a major arch member which partially overlaps on a minor arch member, with an inner pulling wire being tied with one end of said lever which is extended downwards apart from said pivoted point, and the peripheral side of the other end of said lever being contacted on the outer peripheral side face of said minor arch member.

The second object of the present invention is to provide a side-pull bicycle brake mechanism wherein a single lever is freely pivoted on the lower end of one-side coupling arm portion of a major arch member which partially overlaps on a minor arch member, with an inner pulling wire being tied with one end of said lever which is extended downwards apart from said pivoted point, the peripheral side of the other end of said lever being contacted on the outer peripheral side face of said minor arch member, and said pivoted point adjustably varying its position on said coupling arm portion.

Yet still another object of the present invention is to provide a side-pull bicycle brake mechanism, constructed as above wherein said coupling portion of the major arch member where coupled with said lever is divided on the side of the part where said two arch members are overlapped on each other, the divided section extended to said lever being rotatably pivoted on the other divided section not provided with said lever with these two sections being fixed with each other by means of a stop screw and adjustable to take their respective position in relation to each other.

Specific embodiments of the present invention now will be described by way of example with reference to the accompanying drawings, wherein:

FIG. 1 is a front view of the side-pull mechanism bicycle brake mechanism with the lever acting as force magnifying means with unchangeable fixture position according to the present invention;

FIG. 2 is a back view of FIG. 1;

FIG. 3 is a side view of FIG. 1, seen at the side of said lever;

FIG. 4 is a front view of a second embodiment of the invention but providing with the lever with a movable fixture position in a slot;

FIG. 5 is a front view of a third embodiment of the invention wherein the coupling arm portion of a major arch member extended to said lever is divided into two sections;

FIG. 6 is a back view of FIG. 5 as above, and

FIG. 7 is a side view of FIG. 5, seen at the side of said lever.

In FIG. 1–FIG. 3, numeral 1 denotes a major arch member in the rough shape of a horseshoe, one end of which is provided with a section 3 for the fixture of a brake shoe 2 and the other end of which is provided with a coupling arm portion 5 for an inner wire 4. Numeral 6 denotes a minor arch member in the shape of a half horseshoe with a half of said major arch member. The coupling arm portion 5 partially overlaps on this minor arch member, which lower end is provided with the fixture section 8 for a brake shoe 7. The other coupling arm portion 10 for an outer wire 9 projects from one side of the outer periphery of said minor arch member. The major and minor arch members 1, 6 are rotatably pivoted through a bolt 11. The two ends 12', 12' of a spectacleslike spring 12 are hooked on the inner peripheral sides 1', 6' of the respective arch members 1, 6. By means of this spring the two arch members 1, 6 are forced outwards opened so to keep the respective adequate gaps between said shoe 2 and one side of bicycle rim 19 as well as said shoe 7 and the other side of the same rim 19. The main construction of the present invention resides in that the coupling arm portion 5 of the major arch member 1 is coupled by a bolt 17 with a lever 16 which is operable as force magnifying means and provided with a coupling bolt 14 and nut 15 to arrest the end of said inner wire such that the pawl portion 13 formed at the side opposite to said bolt and nut 14, 15 may be contacted to the outer peripheral wall 6". The inner wire 4 is slidably provided in the outer wire 9, constituted as compounding pull wire and is connected to the brake lever attached to bicycle handle side (not shown).

The brake lever is directly connected to one end of the inner wire. The outer wire is forced to travel in the direction opposite to the direction of the inner wire by means of reaction force, such caused by the pulling of the inner wire. This assembly is same to the hitherto proposed side-pull bicycle brake mechanisms.

As shown in FIG. 4, a slot 18 is bored in the fixture location of the coupling arm 5 of the major arch member 1 with the lever 16. This lever is designed to have free fixture position in the scope of the slot 18 in length by using the bolt 17 therein. The other portion of the mechanism is entirely identical with the one shown in FIGS. 1-3.

Further, referring to FIGS. 5-7, the major arch member 1 is provided with the lever 16, same as in FIGS. 1-4, but in addition is distinct in that the coupling arm portion 5 of this major arch member 1 is divided into a stationary section 20 and variable arm section 22 between the distance of the point at which the major arch member is pivoted and the lever extending therefrom.

The stationary section 20 lies near the bolt 11 by which the coupling arm 5 is pivoted, while the variable arm section 22 is loosely fixed by the pivot pin 21 to provide the lever 16 with a movable fixture position, as in FIG. 4. The protruded section 23 is extended aside from the upper part of the variable arm section 22 in the neighborhood of the pivot pin. This part is bored for the adjustable screw 24, the lower end of which is to be contacted on the outer peripheral side face of the lowered stationary section 20. The lower end of the variable arm section 22 is fixed with the lever 16 by the bolt 17. Upon comparing with the embodiment shown in FIGS. 1-4, it is obvious that the part where the pawl portion 13 of the lever 16 is to be contacted on the outer side face of the minor arch member 6 is formed as camlike curved face. The spring 12 is lodged at the pins 26, 26 of the two arch members 1, 6. The other mechanism is the same as shown in FIGS. 1-4. The identical numerals denote the same members common in these figures.

According to FIGS. 5-7, the fixture mechanism of the inner wire 4 and outer wire 9 with respect to the two arch members, particularly by means of the arm portion of the minor arch member 6, does not need the metal fixture unit 27 adjustable up and downwards, required at the coupling portion of the outer wire 9, as in the case shown in FIGS. 1-3. The fixture is achieved by merely inserting one end of the outer wire 9 into the fixture hole 28 through the arm portion 10. The inner wire is also passed through the fixture hole 28.

In the foregoing embodiment as shown in FIGS. 1-3, the brake lever provided at the bicycle handle is gripped by a hand, and the lever 16 connected to the lower end of the inner wire 4 is turned counterclockwise to take a supporting point at the bolt 17 for pivoting the lever 16 with the arm portion 5 of the major arch member 1 by means of the inner wire which has its upper end connected to he brake lever. At the same time, the camlike curved face 25 of the upper end of the lever 6 i.e., the pawl portion 13 contacted on the outer peripheral wall 6" of the minor arch member 6 is forced to inwardly push the wall 6" resisting against the elastic force of the spring 12. The minor arch member 17 is, therefore, clockwise turned to take a supporting point at the bolt 11, so that the brakeshoe 7 is pushed to one side face of the rim 19. Further, the coupling arm portion 5 of the major arch member also is then counterclockwise turned to take the same supporting point at the bolt 11 due to the reaction force caused by the clockwise turning of the minor arch member, as aforesaid, as well as to the reactive lowering of the outer wire 9 in response to the upward pulling of the inner wire 4, so that the brakeshoe 2 provided at the opposite end of the coupling arm portion 5 is inwardly moved, contacted on the opposite side face of the rim 19 and forced to push thereon. The brake effect is thus accomplished due to the simultaneous push of the brakeshoes 2, 7 on the two side faces of the rim 19.

Also in the embodiment shown in FIG. 4, the lever 16 is operable, entirely the same as shown in FIGS. 1-3, due to the fixture with the bolt 17 in the slot 18. In the embodiment shown in FIGS. 5-7 wherein the coupling arm portion 5 is divided into the stationary section 20 and variable arm section 22, the two members 20, 22 are actuated as one body due to the tight fixture with the adjustable screw 24 to achieve the brake effect by means of the brake shoes 2, 7. It is only noted from the embodiment of FIG. 5, that the pawl portion 13 bordering the lever 16 with bolt 17 is longer than the other portion extended to couple with the inner wire and that the part where the pawl portion is contacted on the outer peripheral wall 6" of the minor arch member 6 formed as camlike curved face 25. This face works to inwardly push much more the wall 6" in smooth and continuous manners beginning at the start in harmony with the pulling of the inner wire 4, compared with the embodiment shown in FIGS. 1-3, such to effect force magnifying means for actuating the lever smoothly and lightly.

According to the embodiment shown in FIG. 4 wherein a slot 18 is provided, it is possible to adjust and reduce accurately the two gaps between one side of the rim 19 and the brakeshoe 2 as well as the other side of the rim 19 and the brake shoe 7 by varying the fixture position of the lever 16 with the bolt 17 and then by bringing the lever 16 near to the minor arch member 6, the case that the above gaps may be opened considerably due to the wearing of the two brakeshoes 2, 7 by using for a long period.

According to the embodiment shown in FIGS. 5-7 wherein the coupling arm portion 5 of the major arch member is divided into the stationary section 20 and variable arm section 22, the variable arm section is pivoted through the pin 21, and the lower end of the adjustable screw 24 is contacted on the outer peripheral side of the lowered stationary section 20. It is possible to regulate accurately the above two gaps if the screw 24 goes on to turn the variable arm section 22 in the clockwise direction with the supporting point of the pivoted pin 21 and consequently the lever 16 works out to push inwardly the minor arch member 6 with its camlike curved face 25 while the arm portion of the major arch member 1 opposite to the coupling arm portion 5 is also moved together with the brakeshoe 2 inwardly. In contrast, when the screw 24 is loosened, the brakeshoes 2, 7 of the two arm members 1, 6 are moved far from the rim 19 by the elastic working of the spring 12 such to insure easy adjustment for the above gaps. The present device resides in the avoidance of the complicated construction, as known, with trouble adjustment according to which a special metal fixture unit is provided to regulate the above gaps in such a manner that the coupling portion of the conventional outer wire 9 with the minor arch member 6 may go from up to down, otherwise the lower end of the inner wire is tied with the coupling bolt 14 and nut 15. As clear from the above specific embodiment, the present device, when compared with the conventional device wherein one end of the arm portion of the major arch member is pulled upwards directly by the inner wire, lies in the advantages that the required relatively small working force satisfies relatively large force operative on the related actuating members and can be lightly applied such to effect the brake application very quickly and smoothly. This can be accomplished since the lever 16 acting as single type force magnifying means is interposed between the coupling portion of the major arch member 1 and the inner wire 4 to be tied therewith, which lever is pivoted through the bolt 17 on the lower end of the arm portion of the major arch member 1, which pawl portion 13 is contacted on the outer peripheral wall of the minor arch member 6. According to the present device, the lever 16 takes a supporting point at the pivot bolt 17 to facilitate a force magnifying effect by means of lever operation, and the major and minor arch members completely collaborate their actuation each in harmony with the other. Since the pawl portion of the lever 6 is at all times contacted on the outer peripheral wall of the minor arch member the consumption of small force produces a powerful brake effect. Consequently, even in the case where the brake application is required for a long time and sudden applications happen, the brake effect is insured with accuracy to offer safe running. Single-type force magnifying means are merely applied as an indispensable constitution of the present device. The present device is simple in construction, seldom in disorder, and economical in force transmission with a little loss thereof, so far as concerned to side-pull mechanism bicycle brakes. Needless to say, any change in the design as constructed above falls into the scope of the present invention.

What is claimed is:

1. Side-pull bicycle brake mechanism comprising a major arch member, a minor arch member partially lying beneath a coupling arm portion of said major arch member, and a lever acting as force magnifying means said lever being movably pivoted between its ends on the lower end of said coupling arm portion wherein the lower end of said lever is connected with an inner wire used as a pulling wire, and a partial side face of the upper end of said lever is contacted on the outer peripheral side face of said minor arch member at all times to apply a magnified braking force to said major and minor arch members when a tensioning force is applied to said inner wire.

2. Side-pull bicycle brake mechanism comprising a major arch member, a minor arch member partially lying beneath a coupling arm portion of said major arch member, and a lever acting as force magnifying means, said lever being movably pivoted between its ends to the lower end of said coupling arm portion wherein the lower end of said lever is connected with an inner wire used as a pulling wire, a partial side face of the upper end of said lever is contacted on the outer peripheral side face of said minor arch member at all times, the pivot point of said lever to said coupling arm portion being adjustable for adjusting the movement of said major and minor arch members to compensate for brake wear.

3. The side-pull bicycle brake mechanism according to claim 1, wherein the partial side face of the upper end of said lever is formed as a camlike curved face.

4. The side-pull bicycle brake mechanism, according to claim 1, wherein said coupling arm portion is divided into two pieces, one of said pieces extending directly to said lever, said one piece being movably pivoted on the other piece and adapted to be fixed stationary therewith by means of an adjustable screw such to regulate the brake clearance arrestment by adjustment of said screw.

* * * * *